United States Patent [19]

Ohzeki et al.

[11] 4,279,805

[45] Jul. 21, 1981

[54] ALKYLENE-BIS-THIOALKANOIC ACID AMIDE STABILIZERS FOR SYNTHETIC RESINS AND SYNTHETIC RESIN COMPOSITIONS CONTAINING THE SAME

[75] Inventors: Toshio Ohzeki, Urawa; Takanori Semba, Matsudo, both of Japan

[73] Assignee: Argus Chemical Corporation, Brooklyn, N.Y.

[21] Appl. No.: 101,300

[22] Filed: Dec. 7, 1979

[30] Foreign Application Priority Data

Jan. 10, 1979 [JP] Japan ................... 54-1932

[51] Int. Cl.³ .................. C08K 5/20; C07C 103/38
[52] U.S. Cl. ................ 260/45.9 NC; 252/402; 564/154; 260/45.95 R
[58] Field of Search ............ 260/45.9 NC, 561 S; 560/153; 564/154; 252/402

[56] References Cited

U.S. PATENT DOCUMENTS

| | | | |
|---|---|---|---|
| 3,255,136 | 6/1966 | Hecker et al. | 260/45.85 S |
| 3,742,032 | 6/1973 | Beears | 560/153 |
| 3,763,093 | 10/1973 | Kletecka et al. | 260/45.8 NT |

FOREIGN PATENT DOCUMENTS

43-30287 12/1968 Japan .................. 260/561 S
44-31464 5/1969 Japan .

*Primary Examiner*—V. P. Hoke

[57] ABSTRACT

Alkylene bis-thioalkanoic acid amide stabilizers are provided, as well as synthetic resin compositions containing the same, having the general formula:

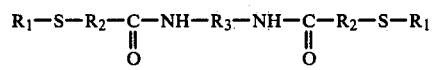

wherein:

$R_1$ is alkyl having from one to about fifty carbon atoms,
$R_2$ is alkylene having from one to about three carbon atoms; and
$R_3$ is alkylene having from two to about twelve carbon atoms.

36 Claims, No Drawings

ALKYLENE-BIS-THIOALKANOIC ACID AMIDE STABILIZERS FOR SYNTHETIC RESINS AND SYNTHETIC RESIN COMPOSITIONS CONTAINING THE SAME

Tokuno et al Japanese patent No. 16,286/68 proposes as stabilizers for polyolefins thioalkanoic acid amides having the formula:

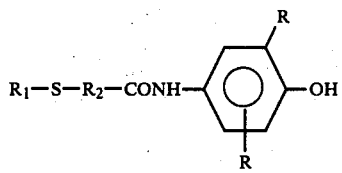

R is alkyl of 1 to 8 carbon atoms, $R_1$ is alkyl of 6 to 24 carbon atoms, and $R_2$ is alkylene of 1 to 6 carbon atoms.

Ozeki et al Japanese patent No. 20,366/68 suggests thioalkanoic acid amides of 1,3,5-triazines having the formula:

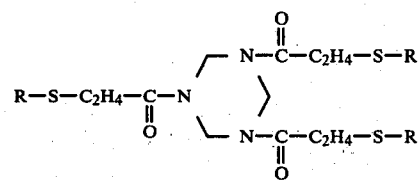

R is alkyl of 8 to 18 carbon atoms.

These also are suggested as stabilizers for polyolefins.

Yamamoto et al Japanese patent No. 23,765/68 proposes as stabilizers for polyolefins bis-thioalkanoic acid amides having the formula:

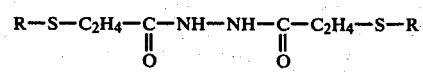

R is alkyl of more than 6 carbon atoms, aryl or aralkyl.

Ozeki et al Japanese patent No. 26,184/69 proposes as polyolefin resin stabilizers another type of bis-thioalkanoic acid amides having the formula:

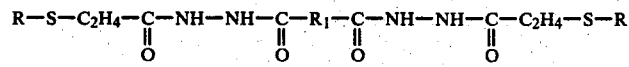

R is alkyl of 12 to 18 carbon atoms, and $R_1$ is alkylene of 1 to 10 carbon atoms, cycloalkylene, or arylene.

Ozeki Japanese patent No. 31,464/69 proposes bis-alkylene thioalkanoic acid amides having the formula:

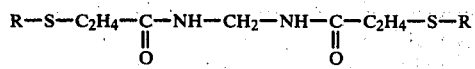

R is alkyl of more than 6 carbon atoms, aryl, or aralkyl.

These also are suggested stabilizers for polyolefins.

Minagawa et al, published Japanese application No. 106,484/74, suggests as stabilizers for organic materials, including synthetic resins, thioalkanoic acid amide derivatives having the formula:

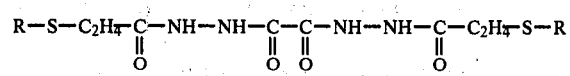

R is hydrocarbyl of 1 to 20 carbon atoms.

In accordance with the present invention, alkylene bis-thioalkanoic acid amides are provided having the general formula:

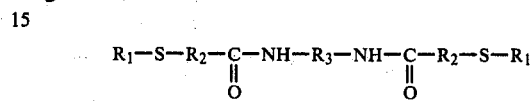

wherein:
$R_1$ is alkyl having from one to about fifty carbon atoms;
$R_2$ is alkylene having from one to about three carbon atoms and
$R_3$ is alkylene having from about two to about twelve carbon atoms.

These alkylene bis-thioalkanoic acid amides are excellent stabilizers for synthetic resins, particularly polyolefins, and in combinations with a phenolic antioxidant display an enhanced or synergistic stabilizing effectiveness.

Accordingly, there are also provided, in accordance with the invention, synthetic resin compositions having enhanced resistance to deterioration by heat and light comprising an alkylene bis-thioalkanoic acid amide of the above formula and, preferably, a phenolic antioxidant, each in amounts synergizing the stabilizing effectiveness of the other.

Exemplary $R_1$ alkyl groups falling within the above formula, which can be straight chain or branched, include methyl, ethyl, propyl, isopropyl, butyl, isobutyl, secondary butyl, tertiary butyl, amyl, isoamyl, tertiary amyl, hexyl, isohexyl, tertiary hexyl, secondary hexyl, heptyl, isoheptyl, octyl, isooctyl, 2-ethylhexyl, tertiary octyl, nonyl, isononyl, decyl, undecyl, dodecyl, tridecyl, tetradecyl, hexadecyl, octadecyl, eicosyl, behenyl, docosyl, tricosyl, tetracosyl, octacosyl, triacontyl, tetracontyl, hexatriacontyl, and pentacontyl.

Exemplary $R_2$ and $R_3$ alkylene groups, which can be straight chain or branched, include methylene, ethylene, propylene-1,3, propylene-1,2; butylene-1,3; butylene-1,2; butylene-2,3; pentylene-1,5; pentylene-2,4; pentylene-3,5; hexylene-1,6; hexylene-2,5; hexylene-3,4; hexylene-3,5; 2-methyl-pentylene; heptylene; 2,2-dimethyl-propylene; octylene; nonylene; decylene; undecylene; and dodecylene.

Exemplary alkylene bis-thioalkanoic acid amides in accordance with the invention and falling within the formula above include:

1. 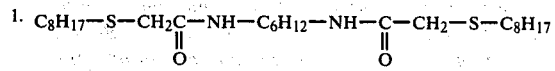

-continued

2. $C_{12}H_{25}-S-C_2H_4-\underset{\underset{O}{\|}}{C}-NH-C_2H_4-NH-\underset{\underset{O}{\|}}{C}-C_2H_4-S-C_{12}H_{25}$ 3. $C_{12}H_{25}-S-C_2H_4-\underset{\underset{O}{\|}}{C}-NH-C_6H_{12}-NH-\underset{\underset{O}{\|}}{C}-C_2H_4-S-C_{12}H_{25}$ 4. $C_{14}H_{25}-S-C_2H_4-\underset{\underset{O}{\|}}{C}-NH-C_{10}H_{20}-NH-\underset{\underset{O}{\|}}{C}-C_2H_4-S-C_{14}H_{25}$ 5. $C_{18}H_{37}-S-C_2H_4-\underset{\underset{O}{\|}}{C}-NH-C_2H_4-NH-\underset{\underset{O}{\|}}{C}-C_2H_4-S-C_{18}H_{37}$ 6. $C_{18}H_{37}-S-C_2H_4-\underset{\underset{O}{\|}}{C}-NH-C_6H_{12}-NH-\underset{\underset{O}{\|}}{C}-C_2H_4-S-C_{18}H_{37}$ 7. $C_{30}H_{61}-S-C_2H_4-\underset{\underset{O}{\|}}{C}-NH-C_3H_6-NH-\underset{\underset{O}{\|}}{C}-C_2H_4-S-C_{30}H_{61}$ 8. $C_{30}H_{61}-S-C_2H_4-\underset{\underset{O}{\|}}{C}-NH-C_6H_{12}-NH-\underset{\underset{O}{\|}}{C}-C_2H_4-S-C_{30}H_{61}$ 9. $C_{12}H_{25}-S-CH_2-\underset{\underset{CH_3}{|}}{CH}-\underset{\underset{O}{\|}}{C}-NH-C_6H_{12}-NH-\underset{\underset{O}{\|}}{C}-\underset{\underset{CH_3}{|}}{CH}-CH_2-S-C_{12}H_{25}$ 10. $C_{18}H_{37}-S-CH_2-\underset{\underset{CH_3}{|}}{CH}-\underset{\underset{O}{\|}}{C}-NH-C_{12}H_{24}-NH-\underset{\underset{O}{\|}}{C}-\underset{\underset{CH_3}{|}}{CH}-CH_2-S-C_{18}H_{37}$ 11. $C_{16}H_{33}-S-C_2H_4-\underset{\underset{O}{\|}}{C}-NH-C_3H_6-NH-\underset{\underset{O}{\|}}{C}-C_2H_4-S-C_{18}H_{37}$ The compounds are readily prepared by reaction of the corresponding thioalkanoic acid ester and alkylene diamine. The following procedure is typical:

EXAMPLE A 28.8 g of methyl lauryl thiopropionate and 3.0 g of ethylene diamine were dissolved in 50 ml of ethanol and refluxed for seven hours.

The solvent was distilled off and the residue crystallized from methanol, yielding 17.5 g of white scaly crystalline material, m.p. 136° C.

I.R.: $\nu NH = 3300$ cm$^{-1}$, $\nu C=O = 1640$ cm$^{-1}$

Analysis for $C_{32}H_{64}N_2S_2O_2$: Calculated: C, 67.1; H, 11.2; N, 4.9; S, 11.2; O, 5.6. Found: C, 66.9; H, 113; N, 5.1; S, 11.1; O, 5.6.

Analysis showed the compound was:

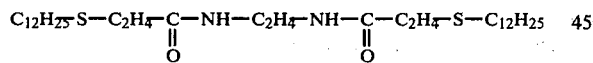

The alkylene bis-thioalkanoic acid amides of the invention are preferably combined with phenolic antioxidant heat stabilizers, thereby constituting light and heat stabilizer compositions of the invention. Optionally, other conventional stabilizers can be included.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

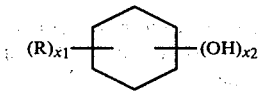

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and

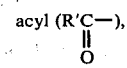

where R' is aryl, alkyl or cycloalkyl.

$x_1$ and $x_2$ are integers from one to four, and the sum of $x_1$ and $x_2$ does not exceed six.

The polycyclic phenol phenol is one having at least two aromatic nuclei linked by a polyvalent linking radical, as defined by the formula:

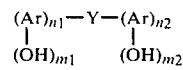

wherein Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkaryl, aralkyl, cycloalkenyl, cycloalkyl, alkoxy, aryloxy and

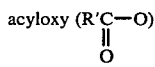

where R' is aryl, alkyl or cycloalkyl, or thiohydrocarbon groups having from one to about thirty carbon atoms, and

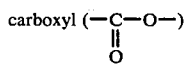

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

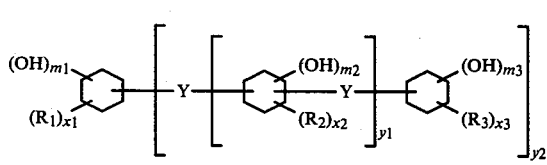

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene arylene, alkyl arylene, arylalkylene, cycloalkylene, cycloalkylidene, and oxa- and thia-substituted such groups; carbonyl groups, tetrahydrofuranes, esters and triazino groups. The Y groups are usually bi, tri or tetravalent, connecting two, three or four Ar groups. However, higher valency Y groups, connecting more than four Ar groups, can also be used. According to their constitution, the Y groups can be assigned to subgenera as follows:

(1) Y groups where at least one carbon in a chain or cyclic arrangement connect the aromatic groups, such as:

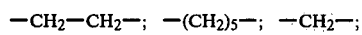

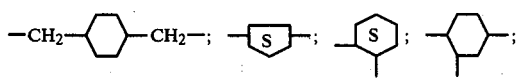

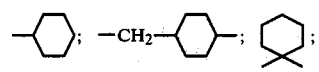

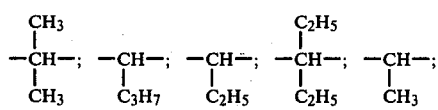

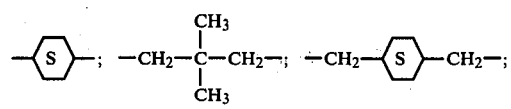

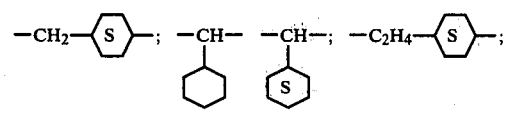

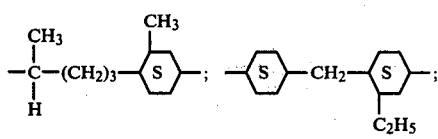

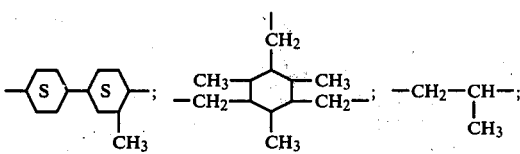

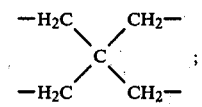

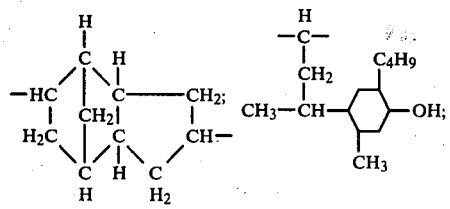

(2) Y groups where only atoms other than carbon link the aromatic rings, such as

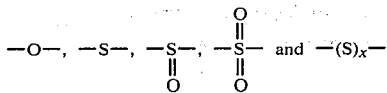

where x is a number from one to ten;
(3) Y groups made up of more than a single atom including both carbon and other atoms linking the aromatic nuclei, such as:

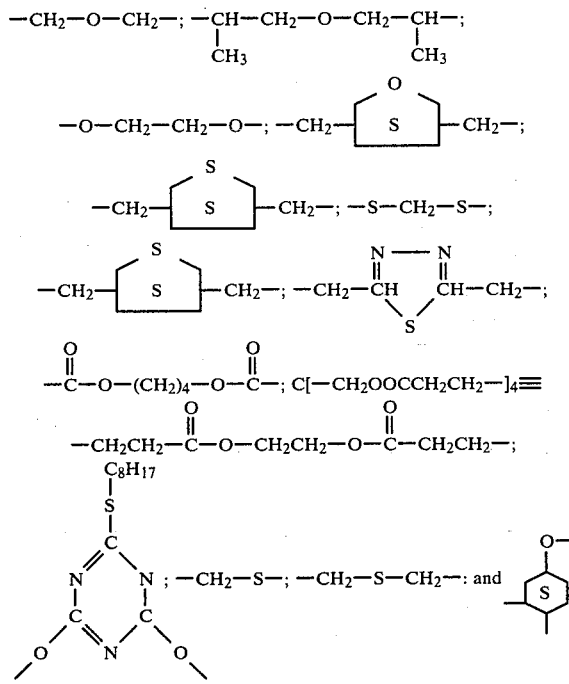

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxycinnamate, 4-benzyloxy-phenol, p-acetylaminophenol, p-stearyl-aminophenol methyl-p-hydroxybenzoate, p-di-chlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl(4-hydroxy-3-methyl-5-t-butyl)benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)-propane, methylene-bis-(p-cresol), 4,4'-benzylidene bis-(2-tertiary-butyl-5-methyl-phenol), 4,4'cyclohexylidene bis-(2-tertiary-butylphenol), 2,2'-methylene-bis-(4-methyl-6-(1'-methylcyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol) 2,2'-methylene-bis-(4-methyl-6-(1'-methyl-cyclohexyl)-phenol, 4,4'-cyclohexylene bis-(2-tertiary-butyl-phenol), 2,6-bis-(2'-hydroxy-3'-t-butyl-5'-methyl-benzyl)-4-methyl-phenol, 4,4'-oxobis(naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl)propane, 2,2'-methylene-bis-(4-methyl-5-isopropylphenol), 2,2'methylene bis-(5-tert-butyl-4-chlorophenol), (3,5-di-tert-butyl-4-hydroxyphenyl)-(4'-hydroxyphenyl)ethane, (2-hydroxy-phenyl)-(3',5'-di-tert-butyl-4',4-hydroxyphenyl)ethane, 2,2'-methylene bis-(4-octylphenol), 4,4'-propylene bis-(2-tert-butyl-phenol), 2,2'-isobutylene bis-(4-nonylphenol), 2,4-bis-(4-hydroxy-3-t-butylphenoxy)-6-(n-octylthio)-1,3,5-triazine, 2,4,6-tris-(4-hydroxy-3-t-butylphenoxy)-1,3,5-triazine, 2,2'-bis-(3-t-butyl-4-hydroxyphenyl)thiazole-(5,4-d)thiazole, 2,2'-bis-(3-methyl-5-t-butyl-4-hydroxyphenyl)thiazolo-(5,4-d)-thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol bis-(3-tert-butyl-4-hydroxyphenoxy acetate), 1,4-butanedio bis-(3-tert-butyl-4-hydroxyphenoxy acetate), pentaerythritoltetra(4-hydroxyphenol propionate), 2,4,4'-tri-hydroxy benzophenone, bis-(2-tert-butyl-3-hydroxy-5-methylphenyl)sulfide, bis-(2-tert-butyl-4-hydroxy-5-methylphenyl)sulfide, bis-(2-tert-butyl-4-hydroxy-5-methyl-phenyl sulfoxide), bis-(3-ethyl-5-tert-butyl-4-hydroxy benzyl)sulfide, bis-(2-hydroxy-4-methyl-6-tert-butyl phenyl)sulfide, 4,4'-bis-(4-hydroxy-phenyl)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methylbenzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butyl phenol)-bis-[3,3-bis-(4-hydroxy-3-t-butylphenyl)butyric acid] glycol ester, 4,4'-butylidene bis-(6-t-butyl-m-cresol), 1,1,3-tris-(2-methyl-4-hydroxy-5-,t-butylphenyl) butane, 1,3,5-tris-(3,5-di-t-butyl-4-hydroxybenzyl)-2,4,6-trimethylbenzene, tetrakis[methylene-3(3,5-di-t-butyl-4-hydroxyphenyl)propionate]methane, 1,3,5-tris-(3,5-di-t-butyl-4-hydroxybenzyl)isocyanurate, 1,3,5-tris-(3,5-di-t-butyl-4-hydroxyphenyl)propionyl-oxyethyl isocyanurate, 2-octylthio-4,6-di-(4-hydroxy-3,5-di-t-butyl)phenoxy- 1,3,5-triazine, 4,4'thiobis(6-t-butyl-m-cresol) and pentaerythritol hydroxyphenyl propionate.

A particularly desirable class of polyhydric polycyclic phenols are the dicyclopentadiene polyphenols, which are of the type:

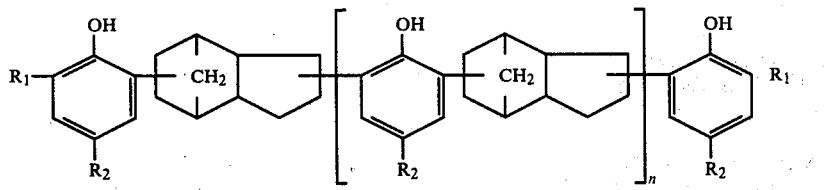

in which

R$_1$ and R$_2$ are lower alkyl, and can be the same or different, and n is the number of the groups enclosed by the brackets, and is usually from 1 to about 5.

These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

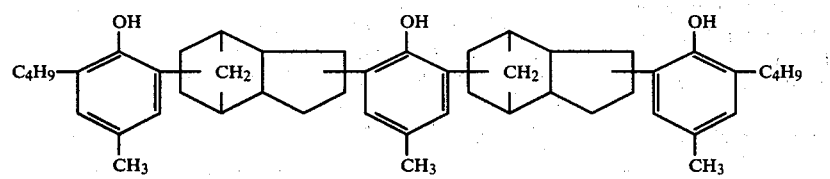

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135 and British patent No. 961,504.

In addition, the stabilizer compositions of the invention can include other stabilizers conventionally used as heat and/or light stabilizers for synthetic resins, including polyvalent metal salts of organic acids, organic triphosphites and acid phosphites.

When the stabilizer composition is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

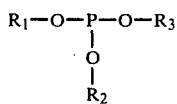

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

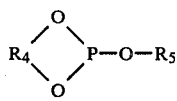

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

$R_5$ is hydrogen or a cation, in the case of the acid phosphites.

Also useful organic triphosphites are mixed heterocyclic-open chain phosphites of the type:

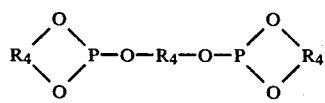

More complex triphosphites are formed from trivalent organic radicals, of the type:

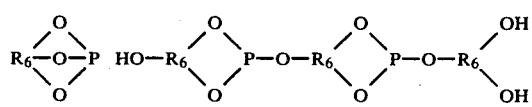

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

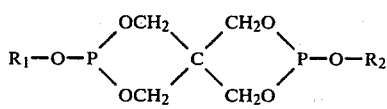

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

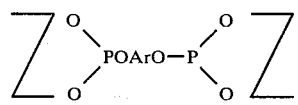

or

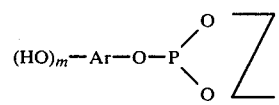

in which Ar is a mono or bicyclic aromatic nucleus and m is an integer of from 0 to about 5.

in one or a plurality of organic radicals as defined above for $R_1$ to $R_6$, taken singly or together in sufficient number to satisfy the valences of the two phosphite oxygen atoms.

One or both

radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri(t-nonylphenyl)phosphite, benzyl methyl isopropyl phosphite, butyl dicresyl phosphite, isooctyl di(octylphenyl)phosphite, di(2-ethylhexyl) (isooctylphenyl)phosphite, tri(2-cyclohexylphenyl)phosphite, tri-α-naphthyl phosphite, tri(phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritoldiphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(-lauryloxy)-2,4,8,10-tetraoxa-3,9-diphosphaspiro-(5,5)-undecane, 3,9-di-p-tolyloxy-2,4,8,10 tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethoxyethyloxy)-2,4,8,10-tetraoxa-3,9-diphosphaspiro-(5,5)-undecane; 3,9-di(methoxy)polyethoxy)ethyloxy)-2,4,8,10-tetraoxa-3,9-diphosphaspiro (5,5)-undecane (where the (polyethoxy) ethyloxy group has an average molecular weight of 350) 3,9-di(methoxy (polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis (2-tertiary butyl-5-methyl-phenol)) isooctyl phosphite, mono (4,4'-thio-bis (2-tertiary-butyl-5-methyl-phenol)) di-phenyl phosphite, tri-(4,4'-n-butylidene-bis(2-tertiary-butyl-5-methyl-phenol)) phosphite, (4,4'-benzylidene-bis (2-tertiary-butyl-5-methyl-phenol)) di-phenyl phosphite, isooctyl 2,2'-bis (-parahydroxyphenyl) propane phosphite, decyl 4,4'-n-butylidene-bis (2-tertiary-butyl-5-methylphenol) phosphite, tri-4,4'-thiobis(2-tertiary-butyl-5-methylphenol) phosphite, 2-ethylhexyl-2,2'-methylene-bis(4-methyl-6,1'-methylcyclohexyl) phenol phosphite, tri(2,2'-bis-(para-hydroxyphenyl) propane) phosphite, tri(4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl 4,4'-n-butylidene-bis(2-tertiary butyl-5-methyl phenyl) diphosphite, tetra-isooctyl 4,4'-thiobis (2-tertiary butyl-5-methyl phenyl) diphosphite, 2,2'-methylene-bis(4-methyl 6,1'-methyl cyclohexyl phenyl) polyphosphite, isooctyl-4,4'-isopropylidene-bisphenyl-polyphosphite, 2-ethylhexyl-2,2'-methylene-bis(4-methyl-6,1'-methyl-cyclohexyl) phenyl triphosphite, tetra-tridecyl-4,4'-oxydiphenyl diphosphite, tetra-n-dodecyl-4,4'-n-butylidene bis(2-tertiary-butyl-5-methyl-phenyl) diphosphite, tetratridecyl-4,4'-iso-propylidene bisphenyl diphosphite, hexa-tridecyl butane-1,1,3-tris (2'-methyl-5'-tertiary-butylphenyl-4'-) triphosphite.

Exemplary acid phosphites are di(phenyl) phosphite, monophenyl phosphite, mono-(diphenyl) phosphite, dicresyl phosphite, di-(o-isooctylphenyl) phosphite, di(p-ethylhexylphenyl) phosphite, di(p-t-octylphenyl) phosphite, di(dimethylphenyl) phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di-(2-phenyl ethyl) phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis (4,4'-thio-bis (2-tertiary-butyl-5-methyl-phenol)) phosphite, (4,4'-thio-bis (2-tertiary-butyl-5-methyl-phenol)) phenyl phosphite, bis (4,4'-n-butylidene-bis (2-tertiary-butyl-5-methyl-phenol)) phosphite, mono (4,4'-benzylidene-bis (2-tertiary-butyl-5-methyl-phenol)) phosphite, mono (2,2'-bis-(-parahydroxyphenyl) propane) phosphite, mono (4,4'-n-butylidene-bis (-2-tertiary-butyl-5-methyl-phenol) phosphite, bis (4,4'-thiobis (2-tertiary-butyl-5-methylphenol)) phosphite, mono-2-ethylhexyl-mono-2,2'-methylene-bis (4-methyl-6,1'methylcyclohexyl) phenol phosphite, bis (2,2'-bis-(para-hydroxyphenyl) propane) phosphite, monoisooctyl mono (4,4'thio-bis (2-tertiary-butyl-5-methyl-phenol)) phosphite, isooctyl-(2,6-bis (2'-hydroxy-3,5-dinonylbenzyl)-4-nonyl phenyl)) phosphite, tri-tridecyl 4,4'-n-butylidene-bis (2-tertiary-butyl-5-methyl phenyl) diphosphite, triisooctyl 4,4'-thiobis (2-tertiary-butyl-5-methyl phenyl) diphosphite, bis (2,2'-methylene-bis (4-methyl-6,1'-methyl cyclohexyl phenyl)) phosphite, isooctyl-4,4'-isopropylidene-bis-phenyl phosphite, monophenyl mono (2,2'-methylene-bis (4-methyl-6,1'-methyl-cyclohexyl)) triphosphite, di-tridecyl-4,4'-oxydiphenyl diphosphite, di-n-dodecyl-4,4'-n-butylidene bis (2-tertiarybutyl-5-methylphenyl) diphosphite, di-tridecyl-4,4'-isopropylidene bisphenyl diphosphite, tetra-tridecyl butane-1,1,3-tris (2'-methyl-5'-tertiary-butylphenyl-4-) triphosphite.

The alkyl thioalkanoic acid amide stabilizers, especially in combination with phenolic antioxidants, and, optionally, other stabilizers, in the stabilizer compositions of the invention, are effective stabilizers to enhance the resistance to deterioration due to heat of synthetic polymeric materials which are susceptible to such degradation.

The stabilizer systems of the invention are especially effective heat stabilizers for olefin polymers such as polyethylene, polypropylene, polybutylene, polypentylene, polyisopentylene, and higher polyolefins.

Olefin polymers on exposure to elevated temperatures undergo degradation, resulting in embrittlement and discoloration.

The stabilizer systems can be employed with any olefin polymer, including low-density polyethylene, high density polyethylene, polyethylenes prepared by the Ziegler-Natta process, polypropylenes prepared by the Ziegler-Natta process, and by other polymerization methods from propylene, poly (butene-1) poly (pentene-1) poly (3-methylbutene-1) poly (4-methylpentene-1), polystyrene, and mixtures of polyethylene and polypropylene with other compatible polymers, such as mixtures of polyethylene and polypropylene, and copolymers of such olefins, such as copolymers of ethylene, propylene, and butene, with each other and with other copolymerizable monomers, which present the instability problem that is resolved by the stabilizer system of the invention. The term "olefin polymer" encompasses both homopolymers and copolymers.

Polypropylene solid polymer can be defined in a manner to differentiate it from other polyolefins as having a density within the range from 0.86 to 0.91, and a melting point above 150° C. The stabilizer system of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer system. Isotactic polypropylene, available commercially under the trade name PRO-FAX, and having a softening or hot-working temperature of about 350° F., is an example of a sterically regular polypropylene polymer.

Mixtures of polypropylene with other compatible polymers and copolymers of propylene with copolymerizable monomers not reactive with the polypropylene stabilizer combination can also be stabilized, for example, mixtures of polyethylene and polypropylene, and copolymers of propylene and ethylene which have a sufficient amount of propylene to present the instability problem that is resolved by the stabilizer combinations of the invention.

The stabilizer combinations are also effective to enhance the resistance to heat degradation of polystyrene; polydienes, such as polybutadiene and polyisoprene; and copolymers of olefins and dienes with other ethylenically and acetylenically unsaturated monomers, such as ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsiloncaprolactam; polyhexamethylene adipamide and polydecamethylene adipamide; polyurethanes; and epoxy resins.

The synthetic polymer can be in any physical form, including (for example)filaments, yarns, films, sheets, molded articles, latex, and foam.

A sufficient amount of the stabilizer combination is used to improve the resistance of the synthetic polymer to deterioration in physical properties, including, for example, discoloration, reduction in melt viscosity and embrittlement, under the conditions to which the polymer will be subjected. Very small amounts are usually adequate. Amounts within the range from about 0.001 to about 5% total stabilizers by weight of the polymer are satisfactory. Preferably, from 0.01 to 3% is employed, for optimum stabilization.

Inasmuch as all components are solids, the stabilizer systems of the invention are readily rendered in solid particulate form, comprising a blend of:
(a) an alkylene bis-thioalkanoic acid amide in an amount of from about 10 to about 35 parts by weight;
(b) a phenolic antioxidant in an amount from about 10 to about 35 parts by weight; optionally and/or
(c) other heat or light stabilizers in an amount of from about 10 to about 35 parts by weight.

The alkylene bis-thioalkanoic acid amide stabilizers of the invention can be employed as the sole stabilizer or in combination with phenolic antioxidant and/or other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flame-proofing agents, pigments and fillers, can be employed.

Preferably, the stabilizer system is added to the synthetic polymer in an amount to provide in the polymer from about 0.001 to about 5% of the alkylene bis-thioalkanoic acid amide, and optionally from about 0.001 to about 5% of phenolic antioxidant and/or other heat or light stabilizer.

The stabilizer combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples illustrate preferred stabilizer systems and resin compositions of the invention:

EXAMPLES 1 TO 6

Polypropylene compositions were prepared using stabilizers of the invention and having the following formulation:

| Ingredient | Parts by Weight |
| --- | --- |
| Polypropylene (Profax 6501) | 100 |
| Tetrakis[methylene-3-(3,5-di-t-butyl-4-hydroxyphenyl)propionate]methane | 0.1 |
| Alkylene bis-thioalkanoic acid amide as listed in Table I | 0.2 |

The composition was thoroughly blended for five minutes in a Barbender Plastograph.

One part of the mixture was then extruded at 20 rpm, cylinder temperature 230° to 240° C. and head die temperature 250° C. Another part was injection-molded at 475 kg/cm², cylinder temperature 240° C., nozzle temperature 250° C., to form sheets 95×40×1 mm.

Pieces 2.5 cm² were cut off from the sheets and heated at 160° C. in a Geer oven to evaluate heat stability.

The time in hours required for the sheet to develop a noticeable discoloraton and/or embrittlement was noted as the hours to failure.

The results obtained are shown in Table I.

TABLE I

| Example No. | Alkylene bis-Thioalkanoic Acid Amide Stabilizer | Hours to Failure |
|---|---|---|
| Control 1 | None | 350 |
| Control 2 | Dilauryl thiodipropionate | 520 |
| Control 3 | Methylene bis-(dodecyl mercaptopropionamide) | 620 |
| Control 4 | Dibutyl thiodipropionamide | 530 |
| 1 | $C_8H_{17}-S-CH_2C(=O)-NH-C_6H_{12}-NH-C(=O)-CH_2-S-C_8H_{17}$ | 740 |
| 2 | $C_{12}H_{25}-S-C_2H_4-C(=O)-NH-C_2H_4-NH-C(=O)-C_2H_4-S-C_{12}H_{25}$ | 810 |
| 3 | $C_{18}H_{37}-S-C_2H_4-C(=O)-NH-C_2H_4-NH-C(=O)-C_2H_4-S-C_{18}H_{37}$ | 820 |
| 4 | $C_{18}H_{37}-S-C_2H_4-C(=O)-NH-C_6H_{12}-NH-C(=O)-C_2H_4-S-C_{18}H_{37}$ | 840 |
| 5 | $C_{30}H_{61}-S-C_2H_4-C(=O)-NH-C_3H_6-NH-C(=O)-C_2H_4-S-C_{30}H_{61}$ | 780 |
| 6 | $C_{18}H_{37}-S-CH_2-CH(CH_3)-C(=O)-NH-C_{12}H_{24}-NH-C(=O)-CH(CH_3)-CH_2-S-C_{18}H_{37}$ | 730 |

It is apparent from the above results that the alkylene bis-thioalkanoic acid amide stabilizers of the invention are superior to other alkylene thioalkanoic acid amides, including their methylene-bis-dodecyl mercaptopropionamide homologue, Control 3, in enhancing resistance of the polypropylene polymer composition to deterioration when heated.

EXAMPLES 7 TO 17

The synergistic stabilizing effectiveness of the alkylene bis-thioalkanoic acid-phenolic antioxidant combinations according to this invention was evaluated in the following polypropylene resin formulation:

| Ingredients | Parts by weight |
|---|---|
| Polypropylene resin (Profax 6501) | 100 |
| Phenolic antioxidant as listed in Table II | 0.1 |
| Hexamethylene 1,6-bis-lauryl thiopropionamide | 0.3 |

The composition was thoroughly blended for five minutes in a Brabender plastograph, injection-molded at 475 kg/cm², cylinder temperature 240° C., nozzle temperature 250° C., to form sheets 95×40×1 mm.

Pieces 2.5 cm² were cut off from the sheets and heated at 160° C. in a Geer oven to evaluate heat stability.

The time in hours required for the sheet to develop a noticeable discoloration and/or embrittlement was noted as the hours to failure.

The results obtained are shown in Table II.

TABLE IIA

| Example No. | Phenolic antioxidant | Hours to Failure |
|---|---|---|
| Control 1 | None | 70 |
| Control 2 | None (0.3 part methylene bis (dodecylmercaptopropionamide instead of hexamethylene 1,6-bis-lauryl thiopropionamide) | 20 |
| 7 | 2,6-di-t-butyl-p-cresol | 320 |
| 8 | 4,4'-butylidene bis(2-t-butyl-5-methylphenol) | 480 |
| 9 | 2,2'-methylene bis(4-methyl-6-t-butylphenol) | 450 |
| 10 | 1,1,3-tris(2-methyl-4-hydroxy-5-t-butylphenyl)butane | 510 |
| 11 | Stearyl-(3,5-di-t-butyl-4-hydroxyphenol)propionate | 940 |
| 12 | 1,6-hexanediol bis[3,5-di-t-butyl-4-hydroxyphenyl)propionate] | 870 |
| 13 | Thiodiethylene glycol bis[(3,5-di-t-butyl-4-hydroxyphenyl)propionate] | 850 |
| 14 | Tris[(3,5-di-t-butyl-4-hydroxyphenyl) propionyloxy ethyl]isocyanurate | 950 |
| 15 | Tetrakis[methylene(3,5-di-t-butyl-4-hydroxyphenyl)propionate]methane | 970 |
| 16 | Tris(3,5-di-t-butyl-4-hydroxy-benzyl) isocyanurate | 760 |
| 17 | Tris(2,6-di-methyl-3-hydroxy-4-t-butylbenzyl)isocyanurate | 710 |

The synergistic effect is evident by comparing Examples 7 to 17 against the control without phenolic antioxidant. The phenolic antioxidants alone, without the alkylene bis-thioalkanoic acid amide, all fail within less than 350 hours, as the following Table IIB shows:

TABLE IIB

| Example No. | Phenolic antioxidant | Hours to Failure |
|---|---|---|
| 7 | 2,6-di-t-butyl-p-cresol(BHT) | 20 |
| 8 | 4,4'-butylidene bis(2-t-butyl-5-methylphenol) | 80 |
| 9 | 2,2'-methylene bis(4-methyl-6-t-butylphenol) | 60 |
| 10 | 1,1,3-tris(2-methyl-4-hydroxy-5-t-butylphenyl)butane | 90 |
| 11 | Stearyl-(3,5-di-t-butyl-4-hydroxyphenyl)propionate | 110 |
| 12 | 1,6-hexanediol bis[(3,5-di-t-butyl-4-hydroxyphenyl)propionate] | 110 |
| 13 | Thiodiethyleneglycol bis[(3,5-di-t-butyl-4-hydroxyphenyl)propionate] | 100 |
| 14 | Tris[(3,5-di-t-butyl-4-hydroxy- | 320 |

TABLE IIB-continued

| Example No. | Phenolic antioxidant | Hours to Failure |
|---|---|---|
| 15 | phenyl)propionyl oxyethyl]isocyanurate Tetrakis[methylene(3,5-di-t-butyl-4-hydroxyphenyl)propionate]methane | 350 |
| 16 | Tris(3,5-di-t-butyl-4-hydroxybenzyl) isocyanurate | 120 |
| 17 | Tris(2,6-di-methyl-3-hydroxy-4-t-butylbenzyl)isocyanurate | 100 |

EXAMPLES 18 TO 23

High density polyethylene compositions were prepared using stabilizers of the invention, and having the following formulation:

| Ingredient | Parts by Weight |
|---|---|
| High-density polyethylene | 100 |
| Ca stearate | 0.1 |
| Stearyl-3(3,5-di-t-butyl-4-hydroxyphenyl)propionate | 0.1 |
| Alkylene bis-thioalkanoic acid amide as listed in Table III | 0.3 |

The stabilizers were blended with the polymer on a two-roll mill, and sheets 0.5 mm thick were prepared by compression molding of the blend.

Each sheet was exposed to hot water at 70° C. for seven days, after which blooming was observed.

Pieces 2.5 cm² were cut off from the sheets, and heated at 150° C. in a Geer oven.

The time in hours when degradation set in, as determined by a significant discoloration and/or embrittlement was noted as hours to failure.

The results are reported in Table III:

TABLE III

| Example No. | Alkylene bis-Thioalkanoic Acid Amide Stabilizer | Hours to Failure | Blooming |
|---|---|---|---|
| Control 1 | None | 160 | None |
| Control 2 | Dilauryl thiodipropionate | 350 | None |
| Control 3 | Bis(dodecyl thiopropionyl) hydrazine | 510 | Remarkable |
| Control 4 | Methylene bis(dodecyl thiopropionamide) | 480 | Remarkable |
| Control 5 | Distearyl thiodipropionamide | 410 | Slight |
| 18 | $C_{12}H_{25}-S-C_2H_4-\underset{\underset{O}{\|}}{C}-NH-C_2H_4-NH-\underset{\underset{O}{\|}}{C}-C_2H_4-S-C_{12}H_{25}$ | 690 | None |
| 19 | $C_{14}H_{25}-S-C_2H_4-\underset{\underset{O}{\|}}{C}-NH-C_{10}H_{20}-NH-\underset{\underset{O}{\|}}{C}-C_2H_4-S-C_{14}H_{25}$ | 670 | None |
| 20 | $C_{18}H_{37}-S-C_2H_4-\underset{\underset{O}{\|}}{C}-NH-C_6H_{12}-NH-\underset{\underset{O}{\|}}{C}-C_2H_4-S-C_{18}H_{37}$ | 680 | None |
| 21 | $C_{30}H_{61}-S-C_2H_4-\underset{\underset{O}{\|}}{C}-NH-C_6H_{12}-NH-\underset{\underset{O}{\|}}{C}-C_2H_4-S-C_{30}H_{61}$ | 620 | None |
| 22 | $C_{12}H_{25}-S-CH_2-\underset{CH_3}{\overset{}{C}H}-\underset{\underset{O}{\|}}{C}-NH-C_6H_{12}-NH-\underset{\underset{O}{\|}}{C}-\underset{CH_3}{\overset{}{C}H}-CH_2-S-C_{12}H_{25}$ | 580 | None |
| 23 | $C_{16}H_{33}-S-C_2H_4-\underset{\underset{O}{\|}}{C}-NH-C_3H_6-NH-\underset{\underset{O}{\|}}{C}-C_2H_4-S-C_{18}H_{37}$ | 640 | None |

It is apparent from the above results that the alkylene bis-thioalkanoic acid amides of the invention are superior stabilizers in enhancing the resistance of the polyethylene polymer composition to deterioration when exposed to heat. They are far superior to their homologue, methylene bis-(dodecyl thiopropionamide).

EXAMPLES 24 TO 26

Ethylene-vinyl acetate copolymer compositions were prepared using stabilizers of the invention and having the following formulation:

| Ingredient | Parts by Weight |
|---|---|
| Ethylene-vinyl acetate copolymer | 100 |
| Montan wax lubricant | 0.3 |
| Stearyl(3,5-di-t-butyl-4-hydroxyphenyl)-propionate | 0.1 |
| Alkylene bis-thioalkanoic acid amide as listed in Table IV | 0.2 |

The stabilizers were blended with the polymer on a two-roll mill at 120° C., and sheets 1 mm thick were then compression molded at 120° C. from the resulting blend.

Each sheet was exposed to hot water at 70° C. for twenty-four hours, after which blooming was observed.

Pieces 2.5 cm² were cut off from the sheets and exposed to heat in a Geer oven at 175° C. The time to failure as evidenced by noticeable discoloration and/or embrittlement is reported in minutes in Table IV.

TABLE IV

| Example No. | Alkylene bis-Thioalkanoic Acid Amide Stabilizer | Minutes to Failure | Blooming |
|---|---|---|---|
| Control 1 | None | 50 | None |
| Control 2 | Ethylene bis-(dodecyl thiopropionate) | 60 | None |
| Control 3 | Octadecyl thiopropionamide | 60 | Remarkable |
| Control 4 | Methylene bis-(octadecyl thiopropionamide) | 70 | Remarkable |
| 24 | $C_{14}H_{25}-S-C_2H_4-\underset{\underset{O}{\|}}{C}-NH-C_{10}H_{20}-NH-\underset{\underset{O}{\|}}{C}-C_2H_4-S-C_{14}H_{25}$ | 120 | None |

TABLE IV-continued

| Example No. | Alkylene bis-Thioalkanoic Acid Amide Stabilizer | Minutes to Failure | Blooming |
|---|---|---|---|
| 25 | $C_{18}H_{37}-S-C_2H_4-\underset{\underset{O}{\|}}{C}-NH-C_6H_{12}-NH-\underset{\underset{O}{\|}}{C}-C_2H_4-S-C_{18}H_{37}$ | 120 | None |
| 26 | $C_{12}H_{25}-S-CH_2-\underset{CH_3}{\overset{}{C}H}-\underset{\underset{O}{\|}}{C}-NH-C_6H_{12}-NH-\underset{\underset{O}{\|}}{C}-\underset{CH_3}{\overset{}{C}H}-CH_2-S-C_{12}H_{25}$ | 110 | None |

It is apparent from the results that the alkylene bis-thioalkanoic acid amides in accordance with the invention are superior even to their homologue, methylene bis-(octadecyl thiopropionamide) in enhancing the resistance of the ethylene-vinyl acetate copolymer to deterioration at elevated temperature.

EXAMPLES 27 TO 30

A group of polyvinyl chloride resin compositions was prepared having the following formulation:

| Ingredient | Parts by Weight |
|---|---|
| Polyvinyl chloride | 100 |
| Di-2-ethylhexylphthalate | 50 |
| Epoxidized soybean oil | 5 |
| Ca stearate | 1.0 |
| Zn stearate | 0.2 |
| Diisodecyl phenyl phosphite | 0.5 |
| Tetrakis[methylene(3,3-di-t-butyl-4-hydroxyphenyl) propionate]methane | 0.05 |
| Alkylene bis-thioalkanoic acid amide as listed in Table V | 0.1 |

This formulation was blended and sheeted off on a two-roll mill to form sheets 1 mm thick.

The sheets were heated in a Geer oven at 175° C. to evaluate heat stability, and the time in minutes noted for the sheet to develop a noticeable discoloration and/or embrittlement.

The results obtained are given in Table V:

It is apparent that the alkylene bis-thioalkanoic acid amides in accordance with the invention are far superior to the Controls.

EXAMPLES 31 TO 35

Acrylonitrile-butadiene-styrene terpolymer resin compositions were prepared using stabilizer compositions of the invention and having the following formulation:

| Ingredient | Parts by Weight |
|---|---|
| Acrylonitrile-butadiene-styrene terpolymer | 100 |
| Calcium stearate | 0.5 |
| Tris[(3,5-di-t-butyl-4-hydroxyphenyl)propionyloxyethyl]isocyanurate | 0.1 |
| $TiO_2$ | 2 |
| Alkylene bis-thioalkanoic acid amide as listed in Table VI | 0.2 |

The stabilizers were blended with the resin on a two-roll mill, and sheets 3 mm thick were prepared by compression molding of the resulting blend.

Heat stability was evaluated by heating the sheets at 210° C. under a stress of 50 kg/cm² for ten minutes, after which the sheets were graded on a scale ranging from 1 to 10 where 1 is colorless and 10 dark brown.

The results are shown in Table VI.

TABLE V

| Example No. | Alkylene bis-Thioalkanoic Acid Amide Stabilizer | Minutes to Failure |
|---|---|---|
| Control 1 | None | 65 |
| Control 2 | Dilauryl thiodipropionate | 75 |
| Control 3 | Distearyl thiodipropionamide | 75 |
| Control 4 | Butyl thiopropionamide | 70 |
| Control 5 | Methylene bis(dodecylthiopropionamide) | 80 |
| 27 | $C_8H_{17}-S-CH_2\underset{\underset{O}{\|}}{C}-NH-C_6H_{12}-NH-\underset{\underset{O}{\|}}{C}-CH_2-S-C_8H_{17}$ | 100 |
| 28 | $C_{14}H_{25}-S-C_2H_4-\underset{\underset{O}{\|}}{C}-NH-C_{10}H_{20}-NH-\underset{\underset{O}{\|}}{C}-C_2H_4-S-C_{14}H_{25}$ | 120 |
| 29 | $C_{30}H_{61}-S-C_2H_4-\underset{\underset{O}{\|}}{C}-NH-C_3H_6-NH-\underset{\underset{O}{\|}}{C}-C_2H_4-S-C_{30}H_{61}$ | 115 |
| 30 | $C_{12}H_{25}-S-CH_2-\underset{CH_3}{\overset{}{C}H}-\underset{\underset{O}{\|}}{C}-NH-C_6H_{12}-NH-\underset{\underset{O}{\|}}{C}-\underset{CH_3}{\overset{}{C}H}-CH_2-S-C_{12}H_{25}$ | 105 |

TABLE VI

| Example No. | Alkylene bis-Thioalkanoic Acid Amide Stabilizer | Color of Sheet |
|---|---|---|
| Control 1 | None | 8 |
| Control 2 | Distearyl thiodipropionate | 6 |
| Control 3 | Methylene bis-(dodecyl thiopropionamide) | 5 |

TABLE VI-continued

| Example No. | Alkylene bis-Thioalkanoic Acid Amide Stabilizer | Color of Sheet |
|---|---|---|
| 31 | $C_{12}H_{25}-S-C_2H_4-\underset{\underset{O}{\|\|}}{C}-NH-C_2H_4-NH-\underset{\underset{O}{\|\|}}{C}-C_2H_4-S-C_{12}H_{25}$ | 2 |
| 32 | $C_{12}H_{25}-S-C_2H_4-\underset{\underset{O}{\|\|}}{C}-NH-C_6H_{12}-NH-\underset{\underset{O}{\|\|}}{C}-C_2H_4-S-C_{12}H_{25}$ | 2 |
| 33 | $C_{18}H_{37}-S-C_2H_4-\underset{\underset{O}{\|\|}}{C}-NH-C_6H_{12}-NH-\underset{\underset{O}{\|\|}}{C}-C_2H_4-S-C_{18}H_{37}$ | 2 |
| 34 | $C_{30}H_{61}-S-C_2H_4-\underset{\underset{O}{\|\|}}{C}-NH-C_6H_{12}-NH-\underset{\underset{O}{\|\|}}{C}-C_2H_4-S-C_{30}H_{61}$ | 3 |
| 35 | $C_{16}H_{33}-S-C_2H_4-\underset{\underset{O}{\|\|}}{C}-NH-C_3H_6-NH-\underset{\underset{O}{\|\|}}{C}-C_2H_4-S-C_{18}H_{37}$ | 2 |

It is apparent from the data that the alkylene bis-thioalkanoic acid amides of the invention are far superior even to their homologue, methylene bis-(dodecyl thiopropionamide).

EXAMPLES 36 TO 39

Polyurethane resin compositions were prepared having the following formulation:

| Ingredient: | Parts by Weight |
|---|---|
| Polyurethane resin (U-100; Asahi Denka Kogyo) | 100 |
| 1,6-Hexanediol-bis[(3,5-di-t-butyl-4-hydroxyphenyl) propionate] | 0.1 |
| 2,6-Di-t-butyl-p-cresol | 0.1 |
| Octyldiphenyl phosphite | 0.2 |
| Alkylene bis-thioalkanoic acid amide as listed in Table VII | 0.1 |

The stabilizers were blended with the polymer on a two-roll mill at 70° C. for five minutes, and sheets 0.5 mm thick were prepared by compression molding of the blend at 120° C. Pieces were cut off from the sheets, and heat stability was determined by heating in a Geer oven at 175° C., and noting the time in minutes for the first noticeable discoloration and/or embrittlement.

The results are shown in Table VII.

TABLE VII

| Example No. | Alkylene bis-Thioalkanoic Acid Amide Stabilizer | Minutes to Failure |
|---|---|---|
| Control 1 | None | 80 |
| Control 2 | Distearyl thiodipropionate | 90 |
| Control 3 | Butyl . octadecyl thiopropionamide | 90 |
| Control 4 | Methylene bis (octadecylthiopropionamide) | 90 |
| 36 | $C_{12}H_{25}-S-C_2H_4-\underset{\underset{O}{\|\|}}{C}-NH-C_6H_{12}-NH-\underset{\underset{O}{\|\|}}{C}-C_2H_4-S-C_{12}H_{25}$ | 130 |
| 37 | $C_{18}H_{37}-S-C_2H_4-\underset{\underset{O}{\|\|}}{C}-NH-C_2H_4-NH-\underset{\underset{O}{\|\|}}{C}-C_2H_4-S-C_{18}H_{37}$ | 120 |
| 38 | $C_{30}H_{61}-S-C_2H_4-\underset{\underset{O}{\|\|}}{C}-NH-C_6H_{12}-NH-\underset{\underset{O}{\|\|}}{C}-C_2H_4-S-C_{30}H_{61}$ | 120 |
| 39 | $C_{16}H_{33}-S-C_2H_4-\underset{\underset{O}{\|\|}}{C}-NH-C_3H_6-NH-\underset{\underset{O}{\|\|}}{C}-C_2H_4-S-C_{18}H_{37}$ | 110 |

The alkylene bis-thioalkanoic acid amides are clearly superior to the Controls.

Having regard to the foregoing disclosure, the following is claimed as the inventive and patentable embodiments thereof:

1. Alkylene bis-thioalkanoic acid amide stabilizers having the formula:

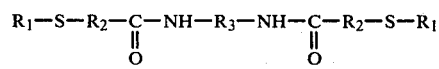

wherein
$R_1$ is alkyl having from one to about fifty carbon atoms;
$R_2$ is alkylene having from one to about three carbon atoms; and
$R_3$ is alkylene having from two to about twelve carbon atoms.

2. Alkylene bis-thioalkanoic acid amide stabilizers according to claim 1 in which $R_1$ is alkyl.

3. Alkylene bis-thioalkanoic acid amide stabilizers according to claim 1 in which $R_2$ is ethylene.

4. Alkylene bis-thioalkanoic acid amide stabilizers according to claim 1 in which $R_2$ is methylene.

5. Alkylene bis-thioalkanoic acid amide stabilizers according to claim 1 in which $R_3$ is ethylene.

6. Alkylene bis-thioalkanoic acid amide stabilizers according to claim 1 in which $R_3$ is propylene.

7. Alkylene bis-thioalkanoic acid amide stabilizers according to claim 1 in which $R_3$ is hexylene.

8. Alkylene bis-thioalkanoic acid amide stabilizers according to claim 1 having the formula:

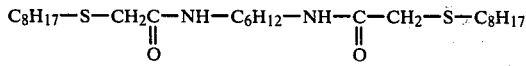

9. Alkylene bis-thioalkanoic acid amide stabilizers according to claim 1 having the formula:

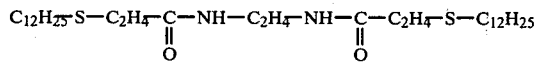

10. Alkylene bis-thioalkanoic acid amide stabilizers according to claim 1 having the formula:

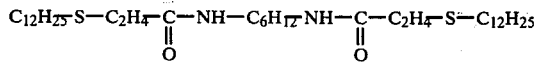

11. Alkylene bis-thioalkanoic acid amide stabilizers according to claim 1 having the formula:

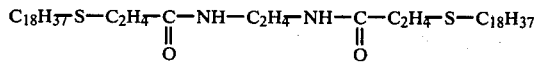

12. Alkylene bis-thioalkanoic acid amide stabilizers according to claim 1 having the formula:

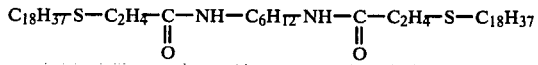

13. A heat stabilizer composition for synthetic resins comprising:
(1) at least one alkylene bis-thioalkanoic acid amide in accordance with claim 1 and
(2) at least one phenolic antioxidant having at least one phenolic hydroxyl group, and at least one phenolic nucleus, and from about eight to about three hundred carbon atoms.

14. A heat stabilizer composition for synthetic resins according to claim 13 in which the phenolic antioxidant is a monocyclic phenol having the structure:

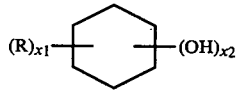

wherein:
R is selected from the group consisting of hydrogen; halogen; and organic radicals containing from one to about thirty carbon atoms selected from the group consisting of alkyl, aryl, alkenyl, alkaryl, aralkyl, cycloalkenyl, cycloalkyl, alkoxy, and acyl (R'C—),
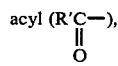

where R' is aryl, alkyl or cycloalkyl; and
$x_1$ and $x_2$ are integers from one to four, and the sum of $x_1$ and $x_2$ does not exceed six.

15. A heat stabilizer composition for synthetic resins according to claim 13 in which the phenolic antioxidant is a polycyclic phenol having at least two aromatic nuclei linked by a polyvalent linking radical, as defined by the formula:

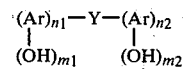

wherein:
Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups having from one up to twenty carbon atoms;
Ar is a phenolic nucleus selected from the group consisting of phenyl and polycarbocyclic groups having condensed or separate phenyl rings; each Ar group containing at least one free phenolic hydroxyl group up to a total of five; and
$m_1$ and $m_2$ are numbers from one to five, and $n_1$ and $n_2$ are numbers of one or greater.

16. A heat stabilizer composition for synthetic resins according to claim 13 in which the phenolic antioxidant is a polyhydric polycyclic phenol having the structure:

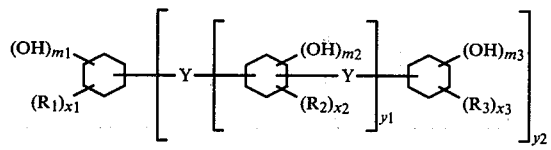

wherein:
$R_1$, $R_2$ and $R_3$ are inert substituent groups;
$m_1$ and $m_3$ are integers from one to a maximum of five;
$m_2$ is an integer from one to a maximum of four;
$x_1$ and $x_3$ are integers from zero to four, and
$x_2$ is an integer from zero to three;
$y_1$ is an integer from zero to about six; and
$y_2$ is an integer from one to five.

17. A polyvinyl chloride resin composition having improved resistance to deterioration when heated at 350° F., comprising a polyvinyl chloride resin and an alkylene bis-thioalkanoic acid amide stabilizer in accordance with claim 1.

18. A polyvinyl chloride resin composition in accordance with claim 17 in which the polyvinyl chloride resin is polyvinyl chloride homopolymer.

19. A polyvinyl chloride resin composition in accordance with claim 17 in which the polyvinyl chloride resin is a copolymer of vinyl chloride and vinyl acetate.

20. An olefin polymer composition having improved resistance to deterioration comprising an olefin polymer selected from the group consisting of polymers of alpha-olefins having from two to six carbon atoms and polystyrene, and an alkylene bis-thioalkanoic acid amide stabilizer in accordance with claim 1.

21. An olefin polymer composition in accordance with claim 20 wherein the polyolefin is polypropylene.

22. An olefin polymer composition in accordance with claim 20 wherein the polyolefin is polyethylene.

23. A polyester polymer composition having improved resistance to deterioration comprising an ethylene-propylene copolymer and an alkylene bis-thioalkanoic acid amide stabilizer in accordance with claim 1.

24. A polyurethane resin composition having improved resistance to deterioration comprising a polyurethane resin and an alkylene bis-thioalkanoic acid amide stabilizer in accordance with claim 1.

25. An ethylene-vinyl acetate copolymer composition having improved resistance to deterioration comprising an ethylene-vinyl acetate copolymer and an alkylene bis-thioalkanoic acid amide stabilizer in accordance with claim 1.

26. An acrylonitrile-butadiene-styrene polymer having its resistance to deterioration when heated at 300° F. and above enhanced by an alkylene bis-thioalkanoic acid amide stabilizer in accordance with claim 1.

27. A polyvinyl chloride resin composition having improved resistance to deterioration when heated at 350° F., comprising a polyvinyl chloride resin and a heat stabilizer composition in accordance with claim 13.

28. A polyvinyl chloride resin composition in accordance with claim 27 in which the polyvinyl chloride resin is polyvinyl chloride homopolymer.

29. A polyvinyl chloride resin composition in accordance with claim 27 in which the polyvinyl chloride resin is a copolymer of vinyl chloride and vinyl acetate.

30. An olefin polymer composition having improved resistance to deterioration comprising an olefin polymer selected from the group consisting of polymers of alpha-olefins having from two to six carbon atoms and polystyrene, and a heat stabilizer composition in accordance with claim 13.

31. An olefin polymer composition in accordance with claim 30 wherein the polyolefin is polypropylene.

32. An olefin polymer composition in accordance with claim 30 wherein the polyolefin is polyethylene.

33. A polyester polymer composition having improved resistance to deterioration comprising a polyester polymer and a heat stabilizer composition in accordance with claim 13.

34. A polyurethane resin composition having improved resistance to deterioration comprising a polyurethane resin and a heat stabilizer composition in accordance with claim 13.

35. An ethylene-vinyl acetate copolymer composition having improved resistance to deterioration comprising an ethylene-vinyl acetate copolymer and a heat stabilizer composition in accordance with claim 13.

36. An acrylonitrile-butadiene-styrene polymer having its resistance to deterioration when heated at 300° F. and above enhanced by a heat stabilizer composition in accordance with claim 13.

* * * * *